(12) United States Patent
Trancik et al.

(10) Patent No.: US 11,346,678 B2
(45) Date of Patent: May 31, 2022

(54) SYSTEM AND METHOD FOR ESTIMATING AND PREDICTING VEHICLE TRIP ENERGY CONSUMPTION

(71) Applicant: Massachusetts Institute of Technology, Cambridge, MA (US)

(72) Inventors: Jessika E. Trancik, Somerville, MA (US); Zachary A. Needell, Cambridge, MA (US); James McNerney, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 210 days.

(21) Appl. No.: 15/677,256

(22) Filed: Aug. 15, 2017

(65) Prior Publication Data

US 2018/0045526 A1 Feb. 15, 2018

Related U.S. Application Data

(60) Provisional application No. 62/374,952, filed on Aug. 15, 2016.

(51) Int. Cl.
*G01C 21/34* (2006.01)
*G06F 16/90* (2019.01)
(Continued)

(52) U.S. Cl.
CPC .......... *G01C 21/3469* (2013.01); *B60K 35/00* (2013.01); *B60K 37/02* (2013.01); *G06Q 10/04* (2013.01); *G06Q 10/06* (2013.01); *G06Q 10/0631* (2013.01); *G06Q 10/06315* (2013.01); *G06Q 50/30* (2013.01);
(Continued)

(58) Field of Classification Search
None
See application file for complete search history.

(56) References Cited

U.S. PATENT DOCUMENTS 5,913,917 A 6/1999 Murphy
6,067,488 A 5/2000 Tano
(Continued)

OTHER PUBLICATIONS

Grubwinkler & Lienkamp; Energy Prediction for EVs Using Support Vector Regression Methods: (AISC, vol. 323) 2014; p. 769-780.

(Continued)

*Primary Examiner* — Lail A Kleinman
(74) *Attorney, Agent, or Firm* — Peter A. Nieves; Sheehan Phinney Bass & Green PA (57) ABSTRACT

A system for estimating or predicting energy consumption for a trip of a personal vehicle includes a user facing portion and a back-end portion. The user facing portion includes a display and a user interface hosting a real-time application configured to receive travel information and present a received energy distribution via the display. The back-end portion includes a back-end database and an energy processor configured to access the back-end database. The energy processor includes a demand model module configured to produce a set of possible velocity histories and a set of possible ambient temperatures. A vehicle model module is configured to receive the velocity histories and ambient temperatures to provide the energy distribution or a probabilistic prediction of future energy consumption to the user facing portion.

7 Claims, 5 Drawing Sheets

(51) Int. Cl.

| | | |
|---|---|---|
| *G01S 19/14* | (2010.01) | |
| *G01S 19/42* | (2010.01) | |
| *G06Q 10/04* | (2012.01) | |
| *G06Q 10/06* | (2012.01) | |
| *G06Q 50/30* | (2012.01) | |
| *B60K 37/02* | (2006.01) | |
| *B60K 35/00* | (2006.01) | |

(52) U.S. Cl.
CPC .. *B60K 2370/155* (2019.05); *B60K 2370/174* (2019.05); *B60K 2370/29* (2019.05); *B60K 2370/334* (2019.05); *G01S 19/14* (2013.01); *G01S 19/42* (2013.01); *G06F 16/90* (2019.01)

(56) References Cited

U.S. PATENT DOCUMENTS

| | | |
|---|---|---|
| 8,214,122 B2 | 7/2012 | Krupadanam |
| 8,346,420 B2 | 1/2013 | Tarnowsky et al. |
| 8,565,964 B2 | 10/2013 | Tanoue |
| 8,694,232 B2 | 4/2014 | Kono |
| 8,874,367 B2 | 10/2014 | Vicharelli et al. |
| 8,886,418 B2 | 11/2014 | Yucel |
| 8,948,964 B2 | 2/2015 | Pan |
| 8,989,999 B2 | 3/2015 | Vicharelli et al. |
| 8,996,198 B2 | 3/2015 | MacNeille et al. |
| 9,037,327 B2 | 5/2015 | Kim |
| 9,121,722 B1 | 9/2015 | Yu et al. |
| 9,376,971 B2 | 6/2016 | Luther et al. |
| 2011/0224868 A1 | 9/2011 | Collings, III et al. |
| 2013/0151046 A1 | 6/2013 | Choi et al. |
| 2013/0173084 A1 | 7/2013 | Tagawa et al. |
| 2014/0214267 A1 | 7/2014 | Sellschopp |
| 2014/0358430 A1 | 12/2014 | Xu et al. |
| 2015/0241310 A1 | 8/2015 | Brown |
| 2016/0061610 A1* | 3/2016 | Meyer .................. B60L 58/12 701/22 |
| 2016/0123755 A1 | 5/2016 | Gambera et al. |

OTHER PUBLICATIONS

Grubwinkler, et al; IEEE Intelligent Vehicles Symposium Proceedings; 2014, p. 1069-1076.

International Search Report for PCT/US17/46878, dated Nov. 3, 2017.

\* cited by examiner

SYSTEM AND METHOD FOR ESTIMATING AND PREDICTING VEHICLE TRIP ENERGY CONSUMPTION

CROSS-REFERENCE TO RELATED APPLICATIONS

This application claims the benefit of U.S. Provisional Patent Application Ser. No. 62/374,952, filed Aug. 15, 2016, entitled "TripEnergy," which is incorporated by reference herein in its entirety.

GOVERNMENT LICENSE RIGHTS

This invention was made with Government support under Grant No. DTRT12-G-UTC01 awarded by the U.S. Department of Transportation. The Government has certain rights in the invention.

FIELD OF THE INVENTION

The present invention relates to automobiles, and more particularly, is related to automotive fuel consumption.

BACKGROUND OF THE INVENTION

Estimating vehicle energy consumption is important for nationwide climate policy, local and statewide environmental policy, and technology investment and development. Transportation energy use depends on many factors, including vehicle performance and the driving behavior of individuals as well as on travel patterns of cities and regions. Estimating personal vehicle energy consumption may be useful for different types of vehicles, including electric vehicles, combustion engine vehicles, and hybrid vehicles.

Presently, there are two widely used methods of estimating energy consumption for a single trip, a traveler's daily or long-term travel patterns, or trips from a population of travelers. The first and simplest method is simply using a vehicle's rated fuel economy (often published in units of miles per gallon) and a trip distance. A benefit of this method is that it is very easy and requires only limited information that is widely available in many travel surveys. Estimates based on fixed energy consumption per unit distance ignore the potentially significant variations in energy consumption based on driving aggressiveness, external temperature, and average speed. This limits the usefulness for work that seeks to measure reductions in energy consumption due to changes in driving style, congestion, or local climate.

The other widely used method to estimate trip energy consumption is simulation, usually through complex black-box applications such as ADVISOR, Autonomie, or ALPHA. While these methods capture very detailed aspects of vehicle operation and energy consumption, they are often not calibrated to match data for specific vehicles. Additionally, the complexity of these models makes them relatively slow to run and difficult to operate at scale for large datasets, especially in real-time. Finally and most importantly, simulation tools such as these require high-resolution velocity histories as inputs. This kind of high-resolution data is often not available for estimation, and/or the data relies on a small number of typical drive cycles that do not span the full variation in driving behavior that vehicles experience in realistic use.

To address some of the limitations of energy estimates based on either rated fuel economy or microsimulation, researchers have developed hybrid methods that capture some of the complexities of energy use modeled in microsimulation but can be easily and efficiently applied to large travel patterns like estimates based on average fuel economy. Achieving an appropriate balance between detail and applicability in hybrid methods remains an unsolved problem. In particular, behaviorally accurate hybrid methods that combine large and representative sample sizes with realistic trip patterns have been an ongoing goal of transportation modeling.

Some methods seek to approximate a detailed representation of widespread high resolution travel behavior by using the output of travel demand models as proxies for real-world data. These include four-step network flow models and more complex activity-based or car-following models. Simulated trips can be fed into software such as MOVES and combined with information on expected fleet composition, weather, and other variables to estimate energy and emissions for cities or regions. MOVES calculates the expected energy intensity of a given vehicle-mile of travel using distributions of energy intensity for different road types and travel speeds, resulting in energy consumption estimates for particular roadways. Other approaches generate synthetic drive cycles from travel demand models and combine them with vehicle simulation, or directly link microscopic travel demand simulations with detailed vehicle models.

These linked energy and traffic network simulations are a common way to estimate the energy impacts of changes to the transportation network or travel demand. However, they typically do not address technological changes or modifications to driving behavior. Energy consumption in these models is often calibrated using a small number of drive cycles and real-world vehicles, limiting the range of technology and driving conditions captured. A more problematic issue is that many hybrid methods produce estimates of the emissions or energy intensities of each link of the road network, as road-based energy accounting makes it difficult to observe the energy need of individual vehicles over the course of a day. Additionally, the probabilistic nature of the population synthesis and travel demand assignment in these models means that any specific traveler seeking the energy consumption of his or her daily or aggregate travel patterns is unlikely to find a simulated traveler following the same exact travel patterns. Using linked energy and traffic network simulation to estimate the expected energy consumption of individual travelers driving a specific vehicle type, therefore, remains impossible with existing methods. Therefore, there is a need in the industry and in research to address the abovementioned disadvantages.

SUMMARY OF THE INVENTION

Embodiments of the present invention provide a system and method for estimating and predicting vehicle energy consumption. Briefly described, the present invention is directed to a system with a user facing portion and a back-end portion. The user facing portion includes a display and a user interface hosting a real-time application configured to receive travel information and present a received energy distribution via the display. The back-end portion includes a back-end database and an energy processor configured to access the back-end database. The energy processor includes a demand model module configured to produce a set of possible velocity histories and a set of possible ambient temperatures. A vehicle model module is configured to receive the velocity histories and ambient temperatures to provide the energy distribution or a probabilistic prediction of future energy consumption to the user facing portion.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

The following definitions are useful for interpreting terms applied to features of the embodiments disclosed herein, and are meant only to define elements within the disclosure.

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention include a system and method for estimating privately operated vehicle (POV) energy consumption that is applicable to this wide range of uses. The embodiments produce accurate estimates for energy aggregates consistent with top-down inventories (e.g. total gasoline consumption), and generate them from the bottom-up based on second-by-second reconstructions of driving patterns across the U.S. and one or more energy models that work with specific (existing as well as hypothetical, future) vehicles. As a result, the results produced by the exemplary embodiments reflect the effects of aggregate energy use and vehicle- and driver-specific energy use from changes to vehicle technology and driving behavior. The exemplary embodiments estimate energy requirements for individual trips for a wide variety of vehicle models, and may operate probabilistically, producing a distribution of possible energies for each future trip (e.g. one or more) even with limited knowledge about the future. Energy requirements may be flexibly aggregated by region, trip purpose, vehicle type, and a large number of socioeconomic variables. The exemplary embodiments produce coherent results with different levels of detail for inputs, for a wide range of vehicle models in a computationally tractable way. This results in more coverage and accuracy than models based only on GPS surveys or direct vehicle modeling, but addresses a wider range of questions than possible with, for example, fleet-wide emissions models.

Exemplary embodiments of the present invention include a vehicle module for capturing variations in POV performance under a range of driving conditions, and a demand module for reproducing travel patterns across the U.S. at high resolution.

The embodiments address two general goals: first, producing accurate energy estimates for a wide range of vehicles, when applied to realistic driving behavior, and second, producing estimates for individual trips, for national aggregates, and for various levels of aggregation in between.

Energy requirements may vary greatly from trip to trip due to variations, for example, in vehicle technology, driving style, and ambient temperature. Accounting for these variations may result in estimated fuel economy varying in a realistic way with trip characteristics, allowing a number of applications that require location-, time-, and trip-resolved energy estimates. Additionally, because trip-by-trip energy consumption may be highly variable, the embodiments produce a probabilistic picture of energy intensity, which is often more relevant to needs of users.

The most accurate estimate of the trip energy consumption for an individual POV may come from microsimulation or onboard instrumentation, while the best measure of national energy use comes from accounting of fuel sales. Bridging these data types allows analyses that run across scales, i.e. involving both small scale technology performance and large scale energy demand, for example a comparison of the fuel economy and energy use of suburban residents to those in the inner core of a city.

The first embodiment compensates for limitations in the scope and accuracy of data on travel behavior and vehicle characteristics. Data collection from onboard recorders or GPS devices provides detailed information about driving and energy use, but is infeasible to gather at the large scales provided by nationally-representative travel surveys. Furthermore, every vehicle type has distinct performance characteristics that strongly influence energy use.

The first embodiment meets these needs while addressing the limitations in data by combining data from the National Household Travel Survey (NHTS), several GPS-based travel surveys, EPA emissions test parameters and results, and historical weather data. The first embodiment models a wide range of vehicles by drawing on widely available EPA vehicle test results, unlike many microscopic emissions simulators that rely on extensive data collection from a few vehicles.

Figure 1:
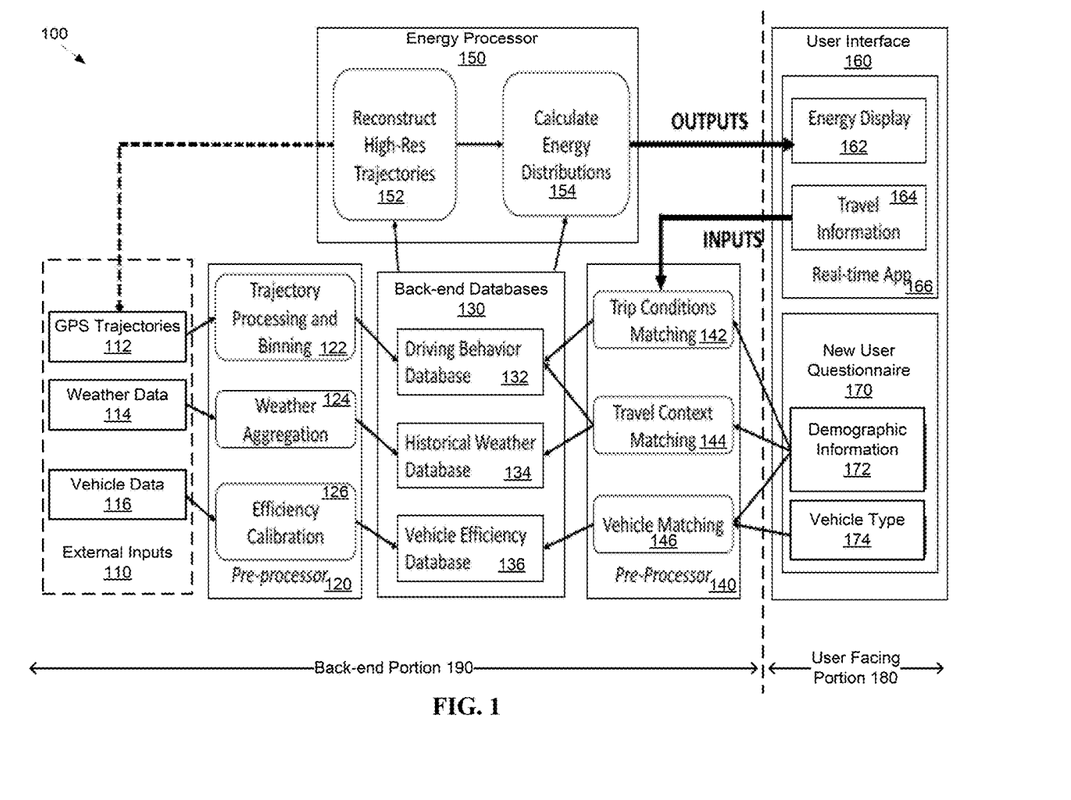
FIG. 1 is a schematic diagram of a first embodiment of a system for estimating energy consumption of a privately owned vehicle.

The first embodiment of a system 100 for estimating energy consumption of a privately owned vehicle broadly consists of a user facing portion 180 and a back-end portion 190. The user facing portion 180 includes a user interface 160 that receives information on travel behavior from the user at different levels of granularity. A new user questionnaire 170 queries a user for data stored as demographic information 172 such as place of residence, household size, and typical work commute and vehicle information 174, while a real-time application 166 may be used to obtain more specific travel information 164 regarding a specific trip or a specific set of actions. For example, the travel information may be entered by the user by the user selecting one or more trips from a database of previous trips, for example, from the National Household Travel Survey (NHTS). The real-time application 166 may also provide an energy display 162 providing estimates of energy usage provided by the back-end portion 190. For example, the energy display 162 may be via a smart phone display screen or a vehicle display screen.

The real-time application 166 may be implemented, for example, as a locally hosted application on a vehicle hosted computing device such as a trip computer, a personal computer or a portable electronic device such as a smart phone, or tablet computer. The real-time application 166 may also be hosted remotely from the device providing the user interface 160, for example, a web-based and/or cloud-based application.

A user facing pre-processor 140 receives data input by the user via the user interface 160 and converts it to a format used by the back-end portion 190. The user facing pre-processor 140 may execute any time the data received by the user interface 160 is updated. The user facing pre-processor 140 receives the demographic information 172 and travel information 164 and performs trip conditions matching 142 including, for example, querying the driving behavior database 132 for information from trips with similar distance and duration to the travel information 164 and expected traffic conditions and driving style indicated in the demographic information 172 on the trip according to the travel information 164. Similarly, the user facing pre-processor 140 performs travel context matching 144 by querying any additional information such as expected weather conditions and expected cargo weight based on the user's demographic information 172. The user facing pre-processor 140 receives the demographic information 172 and the vehicle information 174 to provide the precise make model and year of the vehicle(s) being studied, which are then matched 146 with entries in the vehicle efficiency database 136.

While under the first embodiment the user facing pre-processor 140 may implemented as a module or sub-process of the back-end portion 190, under alternative embodiments the user facing pre-processor 140 may be implemented as part of the user interface 160, for example, executed by the same platform as the Real-Time Application 166.

The back-end portion 190 processes data from the user facing portion 180 as inputs, and uses the processed inputs to access a set of pre-calculated back-end databases 130. The back-end databases may be populated as follows.

External inputs 110 are received by a back-end pre-processor 120. For example, the back-end pre-processor 120 receives GPS trajectories 112 to process trajectory processing and binning 122 that is provided to the driving behavior database 132. The driving behavior database 132 may be updated based on the trip conditions matching 142 and travel context matching 144 provided by the user facing pre-processor 140. Under the first embodiment, the data in the driving behavior database 132 may include high-resolution travel behavior, but may not include contextual information such as demographics and high-level trip conditions. The driving behavior database 132 may be organized so that such contextual information may be used to choose what high-resolution travel behavior is matched and then provided to the energy processor 150.

The back-end pre-processor 120 receives external weather data 114 to process weather aggregation 124 that is provided to the historical weather database 134. The historical weather database 134 may be updated based on the travel context matching 144 provided by the user facing pre-processor 140. The back-end pre-processor 120 receives vehicle data 116 to process efficiency calibration 126 that is provided to the vehicle efficiency database 136. vehicle efficiency database 136 may be updated based on the vehicle matching 146 provided by the user facing pre-processor 140.

An energy processor module 150 reconstructs high resolution trajectories with a demand model module 152 and calculates energy distributions with a vehicle model module 154 using the information in the back-end database 130 in combination with the user-given information to produce and present information about the expected energy consumption of a trip or set of trips to the user, for example, via the energy display 162.

Figure 2:
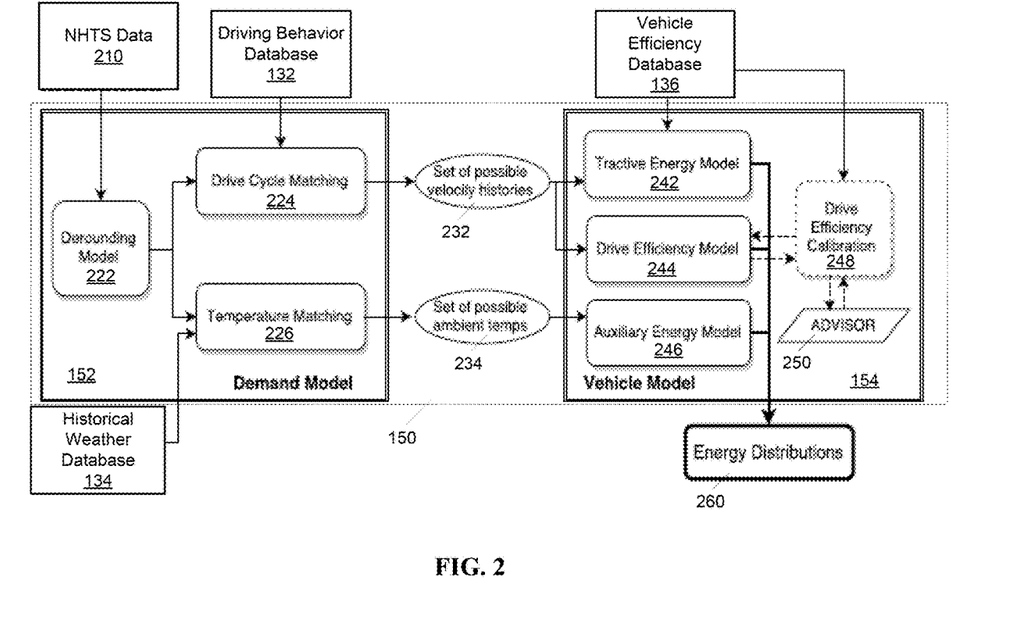
FIG. 2 is a schematic diagram that shows the energy processor module of FIG. 1 in greater detail.

FIG. 2 shows the energy processor module 150 in greater detail. The energy processor 150 includes the vehicle model module 154 that captures variations in POV performance under a range of driving conditions, and the demand model module 152 that reproduces travel patterns across the U.S. at high resolution. The demand model module 152 and the vehicle model module 154 are described below in greater detail.

The demand model module 152 may access a user selected population of trips for study from a source of input data for travel behavior, for example, the National Household Travel Survey (NHTS) data 210. In alternative embodiments, sources for the input data for travel behavior may be, for example but not limited to traffic network simulation, smartphone location traces, and/or individual trip information supplied by a user of the technology. NHTS is a comprehensive source of data on travel behavior in the United States, compiled by the Federal Highway Administration about once every ten years. For example, the 2009 survey covers about one million personal vehicle trips in the U.S., using a weighting scheme to ensure that results are demographically and geographically representative. NHTS provides a wide variety of data on individual trips, including region, number of passengers, trip purpose, and many socioeconomic variables. Using these variables many different subsets of trips can be isolated for analysis depending on the application.

Trip distances and times from NHTS are self-reported, and travel surveys have shown evidence of rounding and other reporting errors. To correct for rounding a derounding model 222 of traveler rounding was fit to the NHTS trip distance and time distributions, providing the probability $p(x|\tilde{x})$ that a rounded distance or time $\tilde{x}$ was originally x. This function can then be used to estimate the distribution of the original unrounded distances and times.

Distances and the times recorded in the NHTS typically show a significant prevalence of rounding, where trip information is recorded by the travelers themselves, who often round distances to the nearest multiple of 5 (miles or minutes) or the nearest multiple of 15. The derounding model 222 corrects for this rounding to obtain more realistic distance and time distributions.

The derounding model 222 employs a model of the rounding process, where individuals round to a multiple of 5 or 15 with some probability, and then inverts the model to obtain the probability of a true value having occurred given an observed rounded value. x denotes the true value of a distance or time and $\tilde{x}$ denotes the recorded time. The probability mass function of $\tilde{x}$, may be denoted by $P(\tilde{x})$, and used to estimate p(x), the probability density of x. p(x) may be computed from $P(\tilde{x})$ as $$p(x) = \sum_{\tilde{x}} p(x|\tilde{x})P(\tilde{x}), \qquad \text{(Eq. 1)}$$

where $p(x|\tilde{x})$ is the conditional probability that the true value was x, given that the recorded value is $\tilde{x}$. To de-round the data, $p(x|\tilde{x})$ is computed.

The demand model module 152 augments the data in the NHTS with detailed information needed to estimate a range of energy values an observed trip could have had. A drive cycle matching component 224 links each trip with a set of similar GPS drive cycles in a set of possible velocity histories 232. The drive cycle matching draws from GPS trajectories 112 from a GPS database with over 100,000 drive cycles collected over several regional travel studies. Similar GPS trips are defined as ones that fall within a set window around the original trip in distance and duration. This matching procedure may be dependent on the source of the travel information 164. If the information consists of low-resolution trajectories gathered from a transportation network simulation or smartphone location services, the trip condition matching 142 may use the driving behavior database 132 of stored segments of real world trajectories 122 to reconstruct a synthetic high resolution trajectory for energy estimation.

The energy requirement of a trip is largely dependent on its velocity history or 'drive cycle'. This information is not available in a travel survey such as NHTS, and thus it is not possible to know the exact energy of a trip observed in this data. The drive cycle matching block 224 derives plausible drive cycles from other sources that can serve as a proxy for the unknown data, and uses it to estimate the probability distribution of trip energy requirements. The driving behavior database 132 provides GPS based drive-cycles to supply realistic trips that match the distance and time of the original survey trip, and uses these proxy drive cycles to estimate tractive energy, as described further below.

First, it is convenient to write the motion-based or 'tractive' energy of a trip into the product of trip distance D and tractive energy-per-distance $\epsilon$. The quantity E characterizes the energy intensity of the trip, which relates strongly to the kind of travel involved, for example, city driving, highway freeflow, bumper-to-bumper traffic, and so on. The value of E is often implicitly taken to be a constant, for example, in estimates based on published fuel economies of vehicles, but actual energy-per-distance can vary significantly for trips of a given distance. The drive cycle matching block 224 estimates the distribution of $\epsilon$ by drawing probabilistically on real values (i.e. bootstrapping) that were computed from the driving behavior database 132. The drive cycle matching block 224 estimates the probability density of $\epsilon$ conditional on the known values of distance and time in the survey trip, since this provides valuable information that helps constrain the plausible values of $\epsilon$. From the law of total probability, the probability density $p(E_{tr})$ of tractive energy $E_{tr}$ for a set of trips can be written in terms of trip distance, time, and energy-per-distance as $$p(E_{tr})=\iiint p(E_{tr}|D,T,\epsilon)p(D,T,\epsilon)dDdTd\epsilon \quad \text{(Eq. 2)}$$

which may be used to derive the distribution of tractive energies $$p(E_{tr}) = \frac{1}{N}\sum_{i=1}^{N}\int \delta(E_n - D_\epsilon)p(\epsilon|D_i, T_i)d\epsilon. \quad \text{(Eq. 3)}$$

For each trip in the survey ($\Sigma_i$), The drive cycle matching block 224 uses its distance and duration ($D_i$; $T_i$), generates plausible values of E given ($D_i$; $T_i$) and computes the resulting tractive energy $E_{tr}=D\epsilon$ and adds it to a list. The drive cycle matching block 224 may repeat these steps many times for a single trip to estimate the distribution of its possible energies. By repeating for each trip in a subset of the survey, the drive cycle matching block 224 may estimate a distribution of trip energies for this subset.

Figure 3:
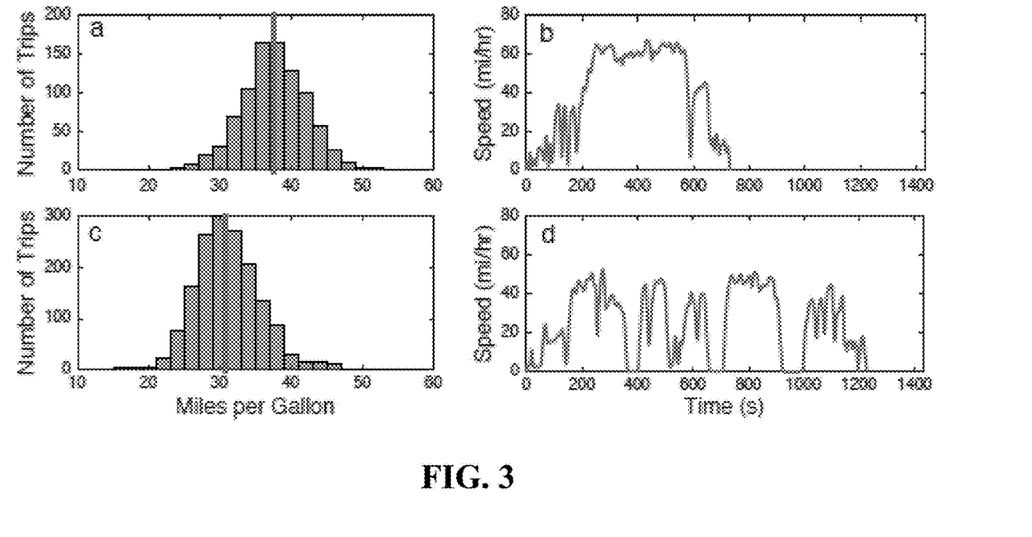
FIG. 3 shows an example of the effect of trip duration on the fuel economy of a specific vehicle.

The demand model module 152 procedure produces a set of possible ambient temperatures 234 that sufficiently differentiate between different types of trips with different energy requirements, as illustrated in FIG. 3. FIG. 3 shows an example of the effect of trip duration on the fuel economy of a specific vehicle, in this case, a 2014 Ford Focus. The right column shows two drive cycles corresponding to 8-mile trips, with durations of 10 minutes (b) and 22 minutes (d). The left column (a,c) shows the distribution of fuel economy values for similar trips in the GPS dataset as chosen by the demand model module 152. The drive cycles shown in the right column correspond to the medians of these distributions, as indicated by the vertical dividing lines. As expected the fuel economy of the faster trip is typically (though not always) higher.

Returning to FIG. 2, the temperature matching block 226 links trips with a range of external temperatures. The temperature matching block 226 associates a tip from the NHTS data 210 with data from the historical weather database 134. For example, each NHTS trip may be paired with a weather station in the Typical Meteorological Year (TMY3) database based on its reported location, for example, its Core Based Statistical Area if one is reported, otherwise its state. The temperature matching block 226 chooses range of possible temperatures from the TMY historical weather database 134 according to the reported month and time-of-day of the trip.

To estimate the external temperature for NHTS trips, the temperature matching block 226 uses data from the historical weather database 134, which may be at least partially derived from, for example, data from the Typical Meteorological Year database. First, each NHTS household is matched with a local weather station, either by state or by Core Based Statistical Area (CBSA). This assigns each NHTS household with a temperature history for an entire year. For each trip in the NHTS the temperature matching block 226 uses the start time and month of the trip to estimate local external temperature at the time of the trip. The temperature is selected by randomly sampling from temperatures that occurred during the trip month at the given trip start time. For example, a trip taking place at 9 AM in the New York City CB SA during the month of January would be matched with any of 31 temperatures measured at JFK International Airport during the month of January. These temperatures are then passed to the auxiliary energy component of the energy model 246 (see below).

The temperature matching block 226 captures both the temporal and regional variability of temperatures that influence vehicle performance. Averaged over a large number of trips, this reproduces the differences in average climate between different locations in the NHTS, but for individual trips it reproduces the extremes in temperature that determine the limits of vehicle performance. Also, because it uses actual trip start times throughout the day, it more accurately captures the typical external temperature than a method based on a daily average temperature or maximum and minimum temperatures.

To summarize the demand model module 152, the drive cycle matching block 224 accesses the set of all linked driving conditions from the driving behavior database 132 to measure a range of plausible operating conditions of the POV trip observed in the NHTS data 210. The combination of drive cycle data, temperature data, and derounding data is forwarded to the vehicle model module 154, described below, leading to a probability distribution for energy requirements of each NHTS trip.

The vehicle model module 154 receives the set of possible velocity histories 232 and the set of possible ambient temperatures 234, and accesses the vehicle efficiency database 136 to produce an energy distribution 260. The energy processor 150 models both vehicle performance and driving demand to determine personal vehicle energy consumption. The vehicle model module 154 calculates tractive energy requirements and the internal efficiency of a given velocity profile, the former using the vehicle efficiency database 136 which may include, for example, EPA test dynamometer coefficients estimated based on CAFE test results. In order to estimate the amount of auxiliary energy used, the distribution of possible ambient temperatures 234 is used for the trip based on its time of day, month, and location, which is converted to climate control energy consumption via an auxiliary energy model 246, for example, a simple energy balance model using factory-rated battery capacity estimates, not considering consumer-reported deviations from these reported values due to battery degradation over time.

The total energy usage $E_{use}$ for a trip of a vehicle may be described as a combination of drive energy $E_{drive}$ needed for vehicle motion and auxiliary energy $E_{aux}$ used for other purposes, primarily climate control, or $E_{use}=E_{drive}+E_{aux}$. To compute $E_{drive}$, may be computed by factor it into final energy $E_{tr}$, also known as tractive energy, the energy actually delivered to the wheels, and a drive efficiency factor $\eta_{drive}$: $E_{drive}=E_{tr}/\eta_{drive}$.

The tractive energy model 242 computes tractive energy $E_{tr}$ for a trip from drive cycles received from the demand model module 152 using standard models of vehicle motion, for example, provided by the vehicle efficiency database 136, with tractive power output of a vehicle given as a function of its speed and acceleration: $P_{tr}(v)=av+bv^2+cv^3+(1+e)\,m y\, dv/dt$. The coefficients a, b, and c are dynamometer or coast down coefficients published by the EPA for many vehicles, m is vehicle mass, and e is a factor accounting for the rotational inertia of a vehicle, assumed to be 1.05 here. Positive values of $P_{tr}$ (corresponding to energy being drawn by the engine) can be integrated over a drive cycle to compute tractive energy $E_{tr}$ for the trip.

Conversion losses are significant for all POVs. An internal combustion engine is thermodynamically limited to efficiencies $h_{drive}$ typically less than 0.4. The nonlinear relationship between engine operating conditions and fuel consumption can be modeled as a polynomial function or by a related method using EPA test result data to fit this function. The vehicle model module 154 uses a fitting approach that exploits data from the vehicle efficiency database 136, for example, using EPA CAFE fuel economy tests. The total energy consumption $\Delta E_B$ for a trip and tractive energy consumption $E_{tr}$ may be calculated from reported unadjusted MPG ratings, the CAFE drive cycles, and dynamometer coefficients of a vehicle. Using the formulation for total energy described above, $h_{drive}$ may then be calculated for a particular CAFE drive cycle as $$\eta_{drive} = \frac{\varepsilon_{tr}}{\Delta E_B - \frac{\varepsilon_{aux}}{\eta_{aux}}}. \quad\text{(Eq. 4)}$$

Using the CAFE city and highway drive cycles, the vehicle model module 154 can estimate two values of $h_{drive}$.

Since $h_{drive}$ varies with driving behavior, the vehicle model module 154 uses a two-parameter function for $h_{drive}$ based on the drive cycle that is calibrated to exactly reproduce energy consumption over the two CAFE drive cycles, for example, by the drive efficiency calibration block 248. Various functional forms have been successfully applied. The form of this function may be based on physical intuition and modeling in ADVISOR 250, but may follow the intuition that internal combustion engines are more efficient at higher speeds and torques, while Battery-Electric Vehicle (BEV) powertrain and regenerative braking efficiencies are roughly constant over a wide range of speed and torque.

Similarly, the auxiliary energy model 246 factors preconversion auxiliary energy into final auxiliary energy delivered to auxiliary systems and the auxiliary efficiency: $E_{aux}=E_{aux}/h_{aux}$. In typical driving most auxiliary energy use comes from climate control. The external temperature received from the demand model determines how hard climate controls must work to maintain cabin temperature within a comfortable range. HVAC energy consumption may be modeled with a steady-state heat balance model: $P_{thermal}=k|\Delta T|$, with the thermal constant k taken to be 350 W/C deg. HVAC power depends on the thermal load to maintain cabin temperature and the coefficient of performance of the climate control system used (e.g. a heat pump, radiant heater, or air conditioner). The vehicle model module 154 adds a constant power of 250 W to power other auxiliaries such as dashboard lights and power steering. The efficiency $h_{aux}$ is taken to be a constant for each powertrain type, for example, equal to 0.185 for Internal Combustion Engine Vehicles (ICEVs), 0.81 for BEVs, which take into account typical powertrain efficiency and power conversion losses.

The demand model module 152 determines overall travel demand off of the NHTS data 210, using the derounding model 222 to remove rounding biases from the self-reported data. Because the NHTS data 210 does not contain high-resolution vehicle speed data, the demand model module 152 probabilistically matches each NHTS trip with a representative set of possible GPS velocity histories. The tractive energy from the vehicle model module 154 and the auxiliary energy from the models 242, 244, 246 are combined to produce the energy distribution 260 mapping the probability of the energy needs of trips from the NHTS data 210. The demand model module 152 may update the GPS Trajectories based on the computed high-resolution trajectories.

Figure 4:
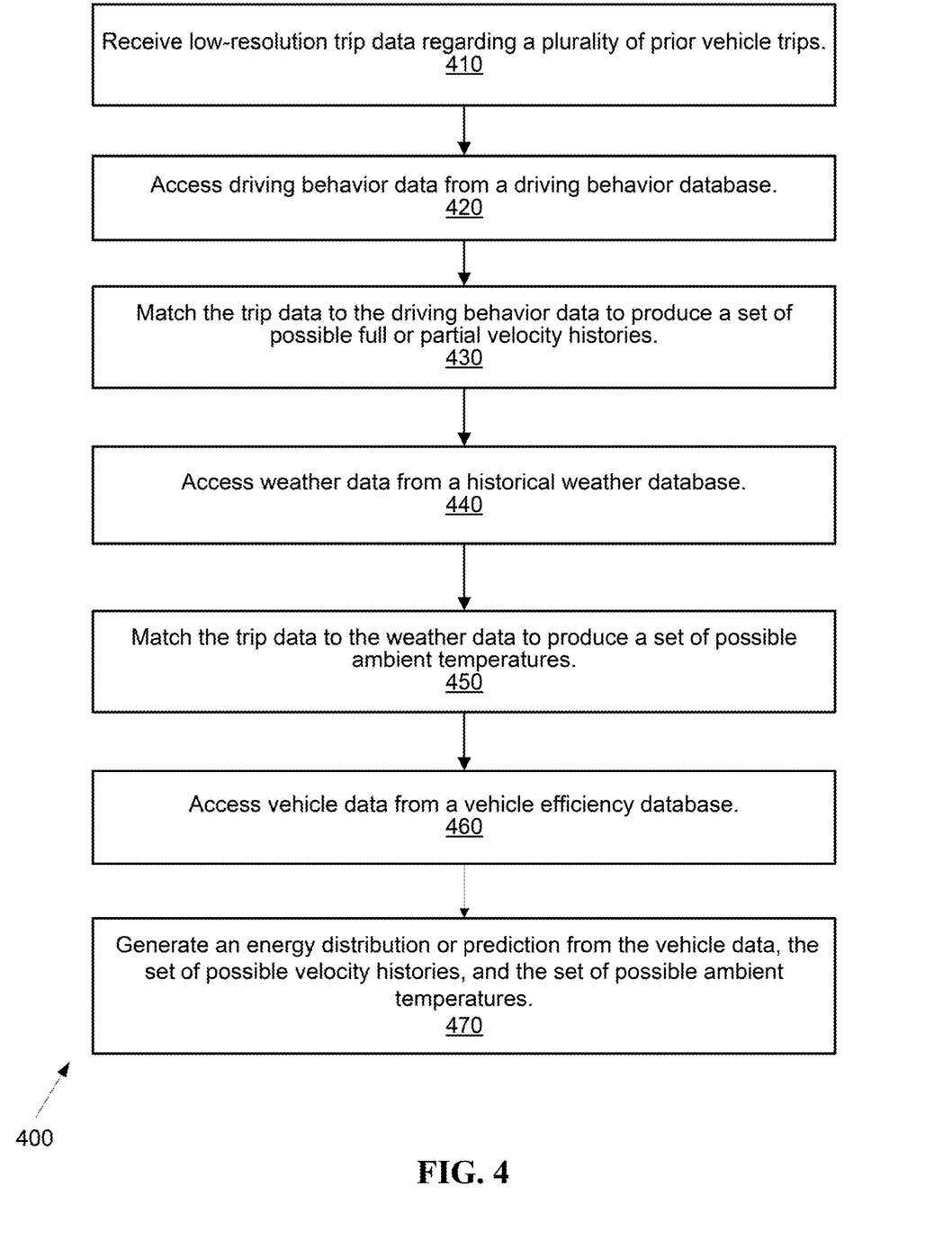
FIG. 4 is a flowchart of an exemplary embodiment of a method for estimating energy consumption for a trip of a predetermined personal vehicle over a predetermined route.

FIG. 4 is a flowchart 400 of an exemplary embodiment of a method for estimating energy consumption for a trip of a predetermined personal vehicle over a predetermined route. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. In the description, reference is made to FIG. 1 and FIG. 2.

Low-resolution trip data 210 regarding a plurality of prior vehicle trips is received, as shown by block 410. Driving behavior data is accessed from a driving behavior database 132, as shown by block 420. Trip data is matched to the driving behavior data to produce a set of possible full or partial velocity histories 232, as shown by block 430.

Weather data is accessed from a historical weather database 134, as shown by block 440. The trip data is matched to the weather data to produce a set of possible ambient temperatures 234, as shown by block 450. Vehicle data is accessed from a vehicle efficiency database 136, as shown by block 460, and an energy distribution 260 or prediction is generated from the vehicle data, the set of possible velocity histories, and the set of possible ambient temperatures, as shown by block 470.

Figure 5:
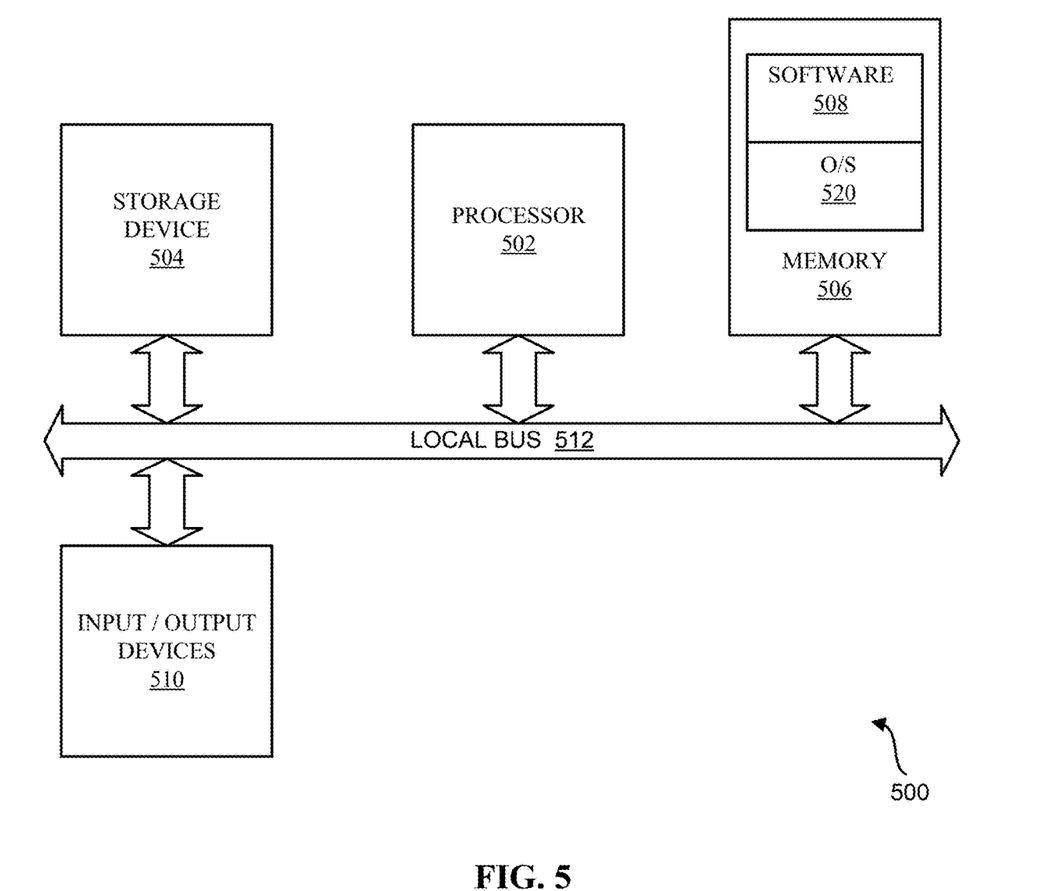
FIG. 5 is a schematic diagram illustrating an example of a system for executing functionality of the present invention.

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The embodiments may be implemented such that the user facing portion 180 is hosted independently from the back-end portion 190, and the user facing portion 180 and the back-end portion 190 communicate via a communication network. For example, the user facing portion 180 may be hosted on a mobile computing device such as a smart phone or a tablet computer, among others, and the back-end portion 190 may be hosted on a server, such as a cloud based server accessed via the internet. Alternatively, the user facing portion 180 and the back-end portion 190 may be hosted on a single computation platform, or may be distributed across two or more processors.

Under the embodiments described above, energy consumption for a vehicle trip may be determined by (1) the vehicle type, (2) macroscopic travel conditions for the trip (e.g. trip distance, trip average speed, % of time on highways, traffic conditions), and (3) the high resolution driving behavior for the trip (e.g., second by second acceleration and braking). The embodiments produce the unexpected result that these three components may be separated and treated independently. Moreover, while macroscopic travel conditions for a driver's travel patterns are determined by the trip location (taking place in a city or rural area, for example) and general travel needs (how many trips are taken and how far they are), the high resolution driving behavior for a trip is actually quite similar among all drivers and locations. This unexpected result is exploited in this invention because it is easier to determine macroscopic travel conditions for a trip (e.g. from a national travel survey, from questions to a user, from data passively collected from a smartphone) than the high resolution travel behavior for that trip. Given fixed general characteristics for a trip, the embodiments indicate an expectation that associated high-resolution driving behavior will be similar regardless of the location, vehicle, et cetera for the trip. Therefore, the embodiments may leverage more limited initial assumptions than earlier systems to produce high-resolution data for calculating energy for a trip reasonably accurately.

Therefore, the embodiments employ a new vehicle model and a way of efficiently storing high resolution driving behavior in a database to more easily combine high resolution with low resolution data to compute energy by matching this high and low resolution data based on contextual information.

The output of the embodiments extends beyond calculating energy for a trip to calculating the energy of trips across the population. This may inform decisions, for example, selecting fleets of cars by businesses and governments, selecting a car to invest in, determining desirable driving behaviors according to a selected vehicle, determining what cars to develop, and deciding how to complement cars with other modes of transport, among others. These decisions may affect energy consumption and emissions, and profitability and convenience to consumers. The output of the embodiments may better inform decisions by individuals, as such decisions may include predictions based on much more data. For example, the embodiments may receive limited information on where a person lives, works, and usually travels use this information to produce results advising what car suits a possible trip, or what car to buy to meet their needs and to save energy. The embodiments provide these options based on determining the energy of trips across the population, which in turn provides a large database to match limited information provided by a user, for example, provided in advance of a decision, with a detailed and much richer and useful prediction.

Unexpectedly the embodiments are able to leverage a smaller set of drive cycle data (GPS data) than prior estimation models to accurately estimate the distribution of energy consumption on a trip-by-trip basis across an entire national population. The embodiments have indicated there is a limited set of driving behaviors followed by drivers that is to a large extent constrained by high-level trip characteristics such as trip distance and trip duration.

It should be noted that alternative embodiments may be used to produce predictions (or past estimates) over a specified period of time in the future of how energy will be consumed in vehicle trips. For example, the specified period of time may be over one year. Such predictions/estimates may be used, for example, to determine whether a specific vehicle or type/class of vehicle is well matched for an individual or for a fleet without knowing in advance precise details of what trips may be taken.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for estimating and/or predicting energy consumption for a personal vehicle, comprising:
   a user facing portion further comprising:
      a display; and
      a user interface further comprising:
         a real-time application configured to receive travel information and present a received energy distribution via the display; and
   a back-end portion in communication with the user facing portion further comprising:
      a back-end database comprising a driving behavior database, a historical weather database, and a vehicle efficiency database;
      an energy processor configured to access the back-end database to implement:
         a demand model module configured to produce:
            a set of possible velocity histories; and
            a set of possible ambient temperatures that differentiate between different types of trips with different energy requirements by associating trips from the driving behavior database with data from the historical weather database; and
         a vehicle model module configured to receive the set of possible velocity histories and the set of possible ambient temperatures to provide the energy distribution or a probabilistic prediction of future energy consumption to the user facing portion, wherein the probabilistic prediction of future energy consumption is based on data within the backend database,
   wherein each of the driving behavior database, the historical weather database, and the vehicle efficiency database of the back-end database further comprises data from a plurality of drivers, a plurality of vehicles, and a plurality of vehicle trips,
   wherein the driving behavior database contains information from driving trips of more than one vehicle for specific distances and specific durations, as well as expected traffic conditions and driving style, and
   wherein the driving behavior database is located remote from the personal vehicle.

2. The system of claim 1, wherein the user facing portion is configured to provide a new user questionnaire to receive from a user external input comprising demographic information and/or vehicle information associated with a vehicle trip.

3. The system of claim 1, wherein the user facing portion comprises a mobile computing device in communication with the back-end portion.

4. The system of claim 1, wherein the back-end portion comprises a cloud based server in communication with the user facing portion.

5. The system of claim 2, further comprising a user facing pre-processor configured to receive the travel information and the external inputs for populating the back-end database.

6. The system of claim 5, wherein the user facing pre-processor is configured to perform the steps of:
   matching vehicle trip conditions;
   matching travel context; and
   matching a vehicle.

7. The system of claim 1, wherein the back-end portion further comprises a back-end pre-processor configured to receive external inputs for populating the back-end database.

\* \* \* \* \*